United States Patent
Nansaka et al.

(10) Patent No.: US 8,216,715 B2
(45) Date of Patent: Jul. 10, 2012

(54) PRISMATIC BATTERY

(75) Inventors: Kenji Nansaka, Itano-gun (JP); Yasuhiro Yamauchi, Sumoto (JP)

(73) Assignee: SANYO Electric Co., Ltd., Moriguichi-shi (JP)

( * ) Notice: Subject to any disclaimer, the term of this patent is extended or adjusted under 35 U.S.C. 154(b) by 499 days.

(21) Appl. No.: 12/473,517

(22) Filed: May 28, 2009

(65) Prior Publication Data

US 2009/0297940 A1     Dec. 3, 2009

(30) Foreign Application Priority Data

May 29, 2008    (JP) ................. 2008-141067

(51) Int. Cl.
 *H01M 2/26* (2006.01)
 *H01M 2/00* (2006.01)
 *H01M 10/16* (2006.01)
 *H01M 4/02* (2006.01)
(52) U.S. Cl. ......... 429/161; 429/163; 429/208; 429/211
(58) Field of Classification Search ........... 429/121–347
 See application file for complete search history.

(56) References Cited

U.S. PATENT DOCUMENTS

| 2004/0038122 A1* | 2/2004 | Hisamitsu et al. ............ 429/120 |
| 2007/0117009 A1* | 5/2007 | Yamauchi et al. ............ 429/160 |

FOREIGN PATENT DOCUMENTS

| JP | 2000-150306 A | 5/2000 |
| JP | 2007-226989 A | 9/2007 |

OTHER PUBLICATIONS

Kazuyuki. JP-2000-150306. "Current collecting system of a battery or capacitor." May 30, 2000. English machine translation provided by JPO.*

* cited by examiner

*Primary Examiner* — Basia Ridley
*Assistant Examiner* — James Lee
(74) *Attorney, Agent, or Firm* — Westerman, Hattori, Daniels & Adrian, LLP

(57) ABSTRACT

A prismatic battery is provided with a fixing portion composed of projections 29Aa and 29Ba for fixing the position of a flat electrode assembly 11 and a battery outer can 12 by contacting with an insulating sheet 32 on at least one of a positive electrode collector member 16 and a negative electrode collector member 18. The insulating sheet 32 is provided between the projections 29Aa, 29Ba and the battery outer can 12. Tips 29Ab and 29Bb of the projections 29Aa and 29Ba project from the flat electrode assembly 11 towards the battery outer can 12 side. The height of the projections is smaller than the thickness of the insulating sheet 32. This prevents short-circuiting between the positive electrode collector member or the negative electrode collector member, and the battery outer can. Thus, a prismatic battery suitable for EVs and HEVs with excellent safety can be obtained.

8 Claims, 8 Drawing Sheets

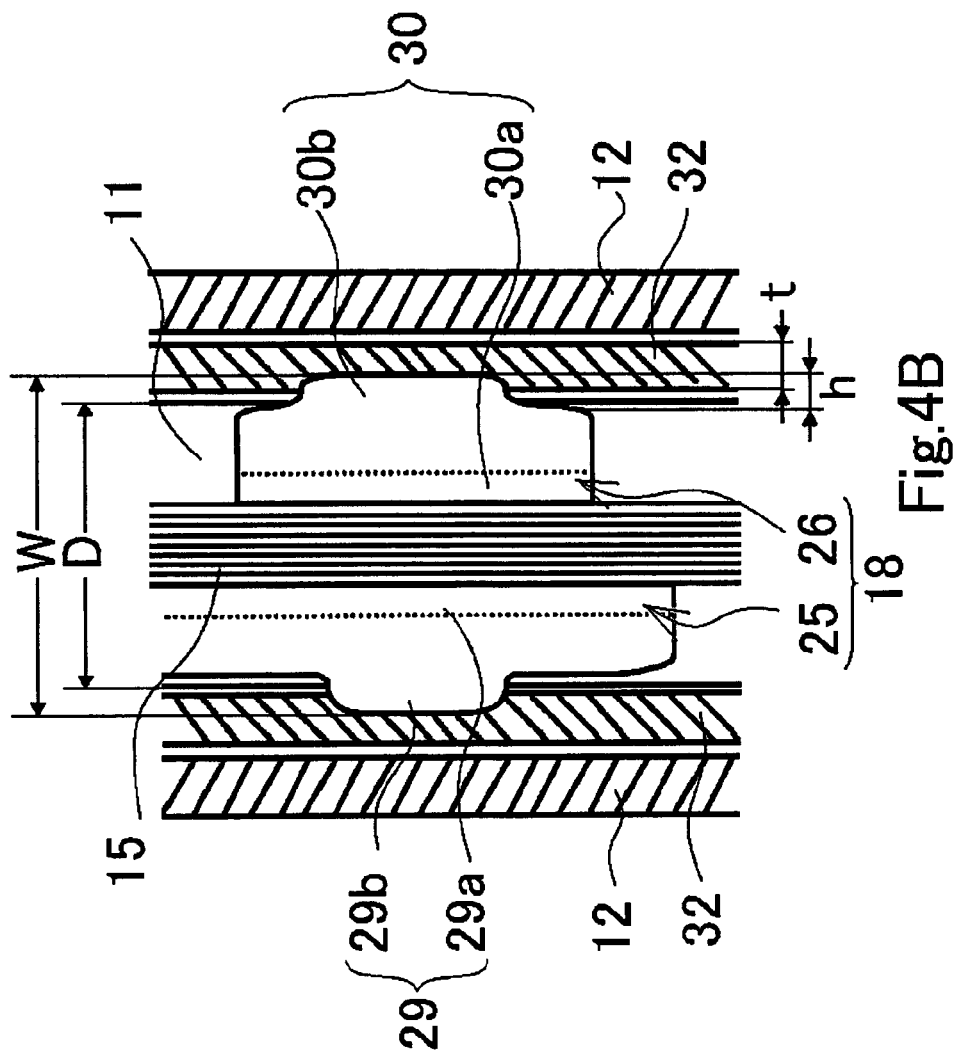
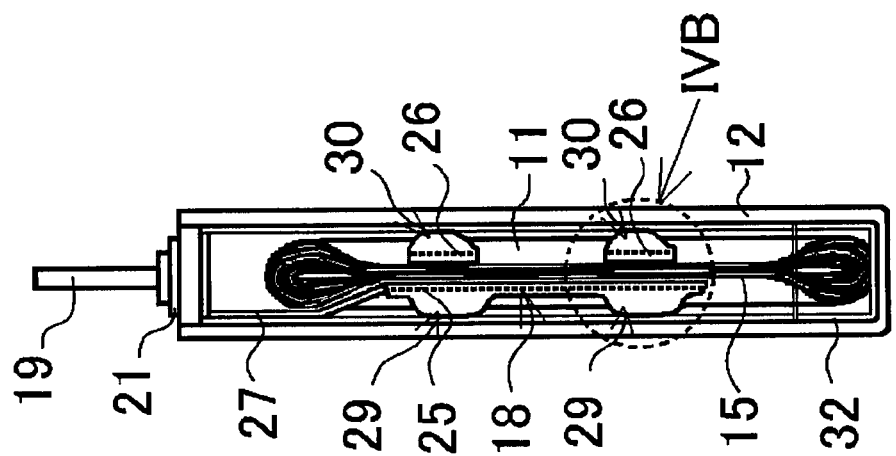
Fig.4A
Fig.4B

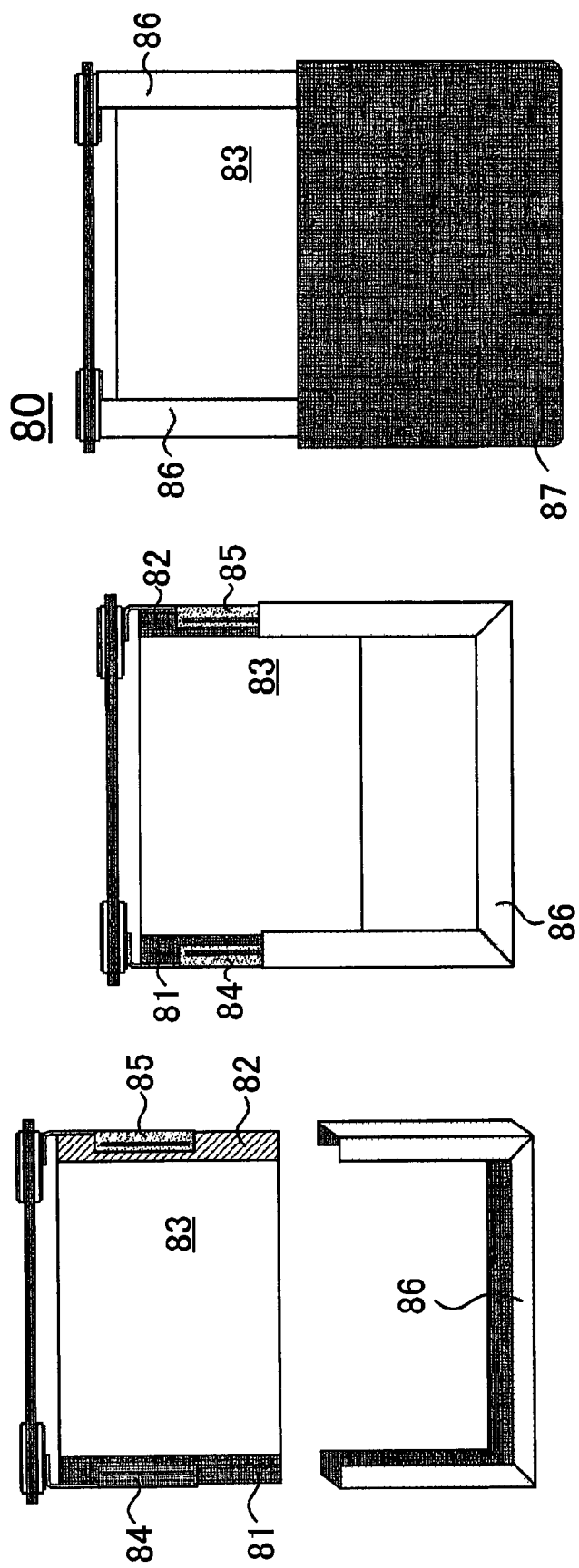

PRISMATIC BATTERY

TECHNICAL FIELD

The present invention relates to prismatic batteries such as nonaqueous electrolyte secondary batteries and nickel-hydrogen batteries. More particularly, the invention relates to a prismatic battery which has a flat electrode assembly provided with a positive electrode substrate exposed portion at one end and a negative electrode substrate exposed portion at the other and housed inside a prismatic battery outer can.

BACKGROUND ART

Alkaline secondary batteries represented by nickel-hydrogen batteries and nonaqueous electrolyte secondary batteries represented by lithium ion batteries are widely used as power sources for cellular phones, portable computers, portable music players and other portable electronic devices. As curbs on emissions of carbon dioxide and other substances have been strengthened against a background of growing movements for environmental protection, in the automobile world there is now vigorous development of electric vehicles (EVs) and hybrid electric vehicles (HEVs) alongside vehicles using fossil fuels such as gasoline, diesel oil and natural gas. In addition, the soaring prices of fossil fuels in recent years have acted to spur on the development of EVs, HEVs and the like.

These nonaqueous electrolyte secondary batteries include cylindrical and prismatic batteries. Since a number of batteries are serially and parallely coupled especially for use in EVs and HEVs, prismatic batteries with favorable spacing efficiency are required. As for such a prismatic battery, for example, a prismatic nonaqueous electrolyte secondary battery is fabricated as follows.

Negative electrode plates are fabricated by applying a negative electrode binder containing a negative electrode active material on both surfaces of a negative electrode substrate (collector) constituted of copper foil or the like having an elongated sheet-like shape. Also, positive electrode plates are fabricated by applying a positive electrode binder containing a positive electrode active material on both surfaces of a positive electrode substrate constituted of aluminum foil or the like having an elongated sheet-like shape. Between a negative electrode plate and a positive electrode plate, a separator made of a microporous polyethylene film or the like is interposed. With the negative electrode plate and the positive electrode plate being insulated from each other by the separator, the negative electrode plate and the positive electrode plate are spirally wound around a cylindrical core, whereby a cylindrical wound electrode assembly is fabricated. Next, this cylindrical wound electrode assembly is flattened out by a press machine and is formed into a flat wound electrode assembly that can be inserted in a prismatic battery outer can. Subsequently, this flat wound electrode assembly is housed inside the prismatic battery outer can, an electrolyte is then poured therein to fabricate a prismatic nonaqueous electrolyte secondary battery. In some cases, a stacked electrode assembly stacked with a negative electrode plate and a positive electrode plate being insulated from each other by a separator is used. Hereinafter, explanations are given by using the term "flat electrode assembly" including the meaning of both a flat wound electrode assembly and a flat stacked electrode assembly.

When housing the flat electrode assembly fabricated as described above into a prismatic battery outer can made of metal, the flat electrode assembly can contact the edge of the battery outer can and may be damaged. Also, there is a case where electrical insulation is needed between the electrode plate positioned on the outer circumference side of the flat electrode assembly and the prismatic battery outer can made of metal. Thus, in the related art, a protective material or an insulating material has been formed on the outer circumference of the flat electrode assembly so that the surface of the flat electrode assembly is not damaged even if the flat electrode assembly contacts the edge of the battery outer can, and also, so as to secure electrical insulation between the flat electrode assembly and the battery outer can. Here, a related-art prismatic battery including such a protective material or an insulating material will be explained with reference to FIG. 6.

FIG. 6A is an exploded side view of a flat electrode assembly disclosed in JP-A-2007-226989, FIG. 6B is a front view illustrating the flat electrode assembly with the insulating frame attached thereto, and FIG. 6C is a front view illustrating the flat electrode assembly with the insulating frame attached thereto and halfway inserted into a prismatic battery outer can made of metal.

The prismatic battery disclosed in JP-A-2007-226989 includes a flat electrode assembly 83 including a positive electrode substrate exposed portion 81 over which positive electrode binder is not spread at one end in the winding axis direction and a negative electrode substrate exposed portion 82 over which negative electrode binder is not spread at the other. The positive electrode substrate exposed portion 81 and the negative electrode substrate exposed portion 82 are bundled, and the bundled positive electrode substrate exposed portion 81 and negative electrode substrate exposed portion 82 are welded with a positive electrode collector 84 and a negative electrode collector 85, respectively (see FIG. 6A). These positive electrode substrate exposed portion 81, the negative electrode substrate exposed portion 82, the positive electrode collector 84, and the negative electrode collector 85 are covered by a frame 86 having a U-shaped cross section and having a U-shaped outer shape (see FIG. 6B). The flat electrode assembly 83 is housed inside a battery outer can 87

In a prismatic battery 80 disclosed in JP-A-2007-226989, since the bundled positive electrode substrate exposed portion 81 and negative electrode substrate exposed portion 82 are respectively welded with the positive electrode collector 84 and the negative electrode collector 85, electrical resistance between the positive electrode collector 84 and the positive electrode substrate, and between the negative electrode collector 85 and the negative electrode substrate can be made small. Also, electrical insulation between the positive electrode plate, the negative electrode plate, the positive electrode substrate exposed portion 81, and the negative electrode substrate exposed portion 82, and the battery outer can 87 becomes preferable. Thus, the prismatic battery 80 is preferable for EVs and HEVs on which large current is caused to flow, and which is powered by a number of batteries being serially and parallely coupled.

However, as shown in FIG. 7 for example, the positive electrode collector 84 and the negative electrode collector 85 of the prismatic battery 80 are welded to a positive electrode substrate welding portion 81a and a negative electrode substrate welding portion 82a, respectively, that are formed or welded so as to be thinner than the flat electrode assembly 83 with the flat portions of the positive electrode substrate exposed portion 81 and the negative electrode substrate exposed portion 82 bundled.

FIG. 7 is a perspective view of the flat electrode assembly shown in FIG. 6.

Consequently, since the positive electrode collector 84 and the negative electrode collector 85 are respectively positioned closer to the center side than the flat surface of the flat electrode assembly 83, unevenness is generated between the flat surface of the flat electrode assembly 83, and the positive electrode collector 84 and the negative electrode collector 85. Thus, when the flat electrode assembly 83 is inserted in the prismatic battery outer can 87 with the assembly 83 covered with the insulating frame 86 made of an insulating sheet and having a U-shaped outer shape, a gap is generated between the insulating frame 86, and the positive electrode collector 84 and the negative electrode collector 85.

Since batteries for EVs and HEVs are used in places where frequent vibration occurs, if a gap is formed between the insulating frame 86, and the positive electrode collector 84 and the negative electrode collector 85, the flat electrode assembly 83 in the battery outer can 87 is prone to fluctuate, which is not preferable. In order to prevent the flat electrode assembly 83 from vibrating in the battery outer can 87, a projection that serves as a fixing portion may be provided to the positive electrode collector 84 and the negative electrode collector 85, and the projection is made to contact the insulating sheet that forms the insulating frame 86 in the battery outer can 87. However, the related-art projection projects from the flat electrode assembly 83 towards the battery outer can 87 with the amount thicker than the insulating sheet that forms the insulating frame 86. Thus, when the flat electrode assembly 83 is inserted in the prismatic battery outer can 87, even a slight deviation of the center line of the flat electrode assembly 83 with respect to the center line of the battery outer can 87 in the width direction makes the projection of the positive electrode collector 84 or the negative electrode collector 85 penetrate through the insulating sheet of the insulating frame 86. Consequently, a short circuit may occur between the flat electrode assembly 83 and the battery outer can 87.

In order to prevent the projection of the positive electrode collector 84 or the negative electrode collector 85 from penetrating the insulating sheet of the insulating frame 86, the area of the surface of each projection may be made large to make the contacting area between the projection and the insulating sheet large. However, if the contacting area between the projection and the insulating sheet is made large, resistance when inserting the flat electrode assembly 83 with the insulating film 86 into the prismatic battery outer can 87 becomes large. Thus, insertability of the flat electrode assembly 83 to the can is degraded and affects the manufacturing efficiency of the prismatic battery.

In JP-A-2000-150306, as shown in FIG. 8A, an example of a current collecting method of a battery or a capacitor 90 is shown. In a clamping current collecting member 91, a retaining portion 92 is formed by folding the tip of the clamping portion into a U shape. The retaining portion 92 is made to contact both a flat electrode assembly 93 and an inner wall of a case body 94. By the elastic force of the retaining portion 92, clamping of the flat electrode assembly 93 and a collector foil stacked portion 95 is made strong. In this battery or the capacitor 90, if the case body 94 is made of a conductive material, in order to insulate a contacting portion of the retaining portion 92 and the inner wall of the case body 94, the retaining portion 92 is covered with an insulating material, or an inner surface of the case body 94 is covered by an insulating film. Further, as shown in FIG. 8B, the contacting portion on the case body 94 side is provided with a resin projecting piece 96.

FIG. 8A is a cross-sectional view of a collector terminal disclosed in JP-A-2000-150306, and FIG. 8B is a partial enlarged view of a modification of the collector terminal shown in FIG. 8A.

The clamping current collecting member 91 of this battery or capacitor 90 has the clamping of the flat electrode assembly 93 and the collector foil stacked portion 95 made strong by the elasticity of the retaining portion 92 folded in a U shape. Thus, the tip of the retaining portion 92 folded in a U shape largely projects from the flat electrode assembly 93 towards the case body 94 side, and the volumetric efficiency is degraded. Also, large compression stress is applied to the insulating material used between the retaining portion 92 folded into a U shape and the case body 94. Thus, using a thin insulating film as an insulating material is difficult, and this also leads to degradation of the volumetric efficiency. In addition, providing the resin projecting piece 96 as shown in FIG. 8B in the case body 94 not only leads to degradation of the volumetric efficiency, but adversely affects the manufacturing efficiency of batteries or the like. Thus, simply adopting the current collecting method of the battery or the capacitor 90 shown in JP-A-2000-150306 for fixing flat electrode assemblies of the prismatic batteries for EVs or HEVs is difficult.

SUMMARY

An advantage of some aspects of the present invention is to provide a prismatic battery having favorable insertability of the flat electrode assembly to the battery outer can by improving the shape of the projection for positioning formed on the positive electrode collector or the negative electrode collector, and further, preventing short-circuiting between the positive electrode collector or the negative electrode collector and the battery outer can even if the center line of the inserted flat electrode assembly deviates from the center line of the battery outer can in the width direction, and being suitable for EVs and HEVs with excellent safety.

According to an aspect of the invention, a prismatic battery includes a flat electrode assembly in which a positive electrode plate formed with a positive electrode substrate exposed portion at an end portion and a negative electrode plate formed with a negative electrode exposed portion at an end portion are wound or stacked in a state where the positive electrode substrate exposed portion and the negative electrode substrate exposed portion are opposed to each other while being insulated from each other by a separator interposed therebetween. The positive electrode substrate exposed portion is bundled and welded with a positive electrode collector member. The negative electrode substrate exposed portion is bundled and welded with a negative electrode collector member. The flat electrode assembly is housed inside a prismatic battery outer can so that the positive electrode collector member is positioned at one end of the prismatic battery outer can and the negative electrode collector member is positioned at the other end. A fixing portion for fixing the position of the flat electrode assembly and the outer can by contacting an insulating sheet is provided on at least one of the positive electrode collector member and the negative electrode collector member. The insulating sheet is provided between the fixing portion and the battery outer can. The fixing portion projects from the flat electrode assembly towards the battery outer can side only by an amount smaller than the thickness of the insulating sheet.

The prismatic battery according to the aspect of the invention includes the flat electrode assembly in which the positive electrode plate formed with the positive electrode substrate exposed portion at an end portion and the negative electrode plate formed with the negative electrode exposed portion at an end portion are wound or stacked in a state where the positive electrode substrate exposed portion and the negative electrode substrate exposed portion are opposed each other while being insulated from each other by the separator interposed therebetween. The positive electrode substrate exposed portion is bundled and welded with the positive electrode collector member. The negative electrode substrate exposed portion is bundled and welded with the negative electrode collector member. The flat electrode assembly is housed inside the prismatic battery outer can so that the positive electrode collector member is positioned at one end of the prismatic battery outer can and the negative electrode collector member is positioned at the other end. With the above configuration, the positive electrode collector and the positive electrode substrate exposed portion, and the negative electrode collector and the negative electrode substrate exposed portion are securely fixed, and the internal resistance between the positive electrode collector and the positive electrode substrate, and between the negative electrode collector and the negative electrode substrate become small. Thus, the prismatic battery according to the aspect of the invention provides a favorable characteristic even when charging and discharging are performed with large current.

The prismatic battery according to the aspect of the invention is provided with a fixing portion that fixes the position of the flat electrode assembly and the outer can by contacting the insulating sheet on at least one of the positive electrode collector member and the negative electrode collector member. Thus, with the prismatic battery of the aspect of the invention, even if vibration is applied to the prismatic battery, the flat electrode assembly rarely moves in the battery outer can.

Also, in the prismatic battery of the aspect of the invention, the fixing portion projects from the flat electrode assembly towards the battery outer can side only by an amount smaller than the thickness of the insulating sheet. Consequently, even if the flat electrode assembly is inserted in the battery outer can with the center of the flat electrode assembly deviating from the center line of the battery outer can in the width direction, since the flat electrode assembly contacts the insulating sheet before the fixing portion penetrates the insulating sheet, the fixing portion rarely penetrates the insulating sheet. Thus, with the prismatic battery of the aspect of the invention, even if the battery is used under the condition in which vibration is applied, the positive electrode collector and the negative electrode collector are rarely short-circuited with the battery outer can compared to related-art prismatic batteries, whereby the reliability is improved. A prismatic battery capable of charging and discharging large current can be thus obtained which is suitable for EVs and HEVs.

In the prismatic battery according to the aspect of the invention, the fixing portion may be provided with a first projection that does not project from the flat electrode assembly towards the battery outer can side, and a second projection that is formed on the first projection, projects from the flat electrode assembly only by an amount smaller than the thickness of the insulating sheet, and has a height smaller than the thickness of the insulating sheet.

In the prismatic battery according to the aspect of the invention, since the first projection does not project from the flat electrode assembly towards the battery outer can side, and the second projection is formed on the first projection, the second projection has a contacting surface that contacts with the insulating sheet smaller than that of the first projection. Thus, with the prismatic battery according to the aspect of the invention, insertability and fixability of the flat electrode assembly to the battery outer can become preferable, and the manufacturing yield of the prismatic battery is improved. Also, since the second projection projects from the flat electrode assembly only by an amount smaller than the thickness of the insulating sheet, even if the flat electrode assembly is inserted in the battery outer can with the center of the assembly deviating from the center line of the battery outer can in the width direction, the flat electrode assembly contacts the insulating sheet before the second projection penetrates the insulating sheet, whereby the second projection rarely penetrates the insulating sheet.

Further, since the height of the second projection is smaller than the thickness of the insulating sheet, even if the collector is welded on the substrate exposed portion while deviating from the center position of the flat electrode assembly, and the first projection projects from the flat electrode assembly towards the battery outer can side, the first projection contacts the insulating sheet in the periphery of the second projection since the height of the second projection is smaller than the thickness of the insulating sheet, whereby the second projection rarely penetrates the insulating sheet. Thus, with the prismatic battery of the aspect of the invention, even if the battery is used under the condition in which vibration is applied, the positive electrode collector and the negative electrode collector are rarely short-circuited with the battery outer can compared to related-art prismatic batteries, whereby the reliability is improved. A prismatic battery capable of charging and discharging large current can be thus obtained which is suitable for EVs and HEVs.

In a nonaqueous electrolyte secondary battery according to the aspect of the invention, the first projection is preferably formed on a surface of at least one of the positive electrode collector member and the negative electrode collector member.

Since the contacting area of the positive electrode collector member and the negative electrode collector member, which are bundled to have a large area, with respect to the positive electrode substrate exposed portion and the negative electrode substrate exposed portion, respectively, can be made large, the area of the first projection can be made large. Thus, even if the second projection bites into the insulating sheet, since the first projection also contacts the insulating sheet at a wide area in the periphery of the second projection, the second projection more rarely penetrates the insulating sheet. Consequently, with the prismatic battery of such an aspect, the positive electrode collector member and the negative electrode collector member can be further prevented from short-circuiting with the battery outer can, and the reliability can be improved. In the prismatic battery according to the aspect of the invention, as long as the fixing portion is provided on at least one location of one of the positive electrode collector member and the negative electrode collector member, the above-described specific effect can be achieved.

In the prismatic battery according to the aspect of the invention, the first projection may be formed of a folded portion of at least one of the positive electrode collector member and the negative electrode collector member.

With the prismatic battery according to the aspect of the invention, simply by folding the positive electrode collector and the negative electrode collector, the tip end portion thereof can be used as the first projection. Thus, the first projection can be formed easily, and furthermore, the fixing portion can be formed easily.

In the prismatic battery according to the aspect of the invention, the insulating sheet is preferably made of an insulating resin sheet.

Since the insulating resin sheet is flexible, the sheet can be folded so as to cover the entire surface of the flat electrode assembly, and also can be made to have a U-shaped cross section so as to cover the side surface of the flat electrode assembly. Consequently, with the prismatic battery of the aspect of the invention, the structure becomes simple, and the manufacturing becomes easy, whereby the insulating sheet can be manufactured at low cost.

In the prismatic battery according to the aspect of the invention, the insulating resin sheet may be made of one kind of resin selected from polypropylene (PP), polyethylene (PE), polyphenylene sulfide (PPS), polyether ether ketone (PEEK), and nylon.

According to the prismatic battery of the invention, since the insulating resin sheet has high strength and favorable heat resistivity, a prismatic battery that favorably achieves the above-described effects can be obtained.

BRIEF DESCRIPTION OF THE DRAWINGS

The invention will be described with reference to the accompanying drawings, wherein like numbers reference like elements.

FIG. 4A is a cross-sectional view, along line IIA-IIA in FIG. 1, of the second working example prismatic battery, and FIG. 4B is an enlarged cross-sectional view of portion IVB in FIG. 4A.

FIG. 6A is an exploded side view of a related-art flat electrode assembly, FIG. 6B is a front view illustrating the flat electrode assembly with the insulating frame attached thereto, and FIG. 6C is a front view illustrating the flat electrode assembly with the insulating frame attached thereto and halfway inserted into a prismatic battery outer can made of metal.

DESCRIPTION OF EXEMPLARY EMBODIMENTS

Exemplary embodiments of the invention will now be described with reference to the accompanying drawings and to working examples and a comparative example. It should be understood however that the embodiments below are intended by way of illustrative examples of prismatic batteries that carry out the technical concepts of the invention, and are not intended by way of limiting the invention to these particular prismatic batteries. The invention could equally well be applied to yield other embodiments within the scope and spirit of the claims.

Figure 1:
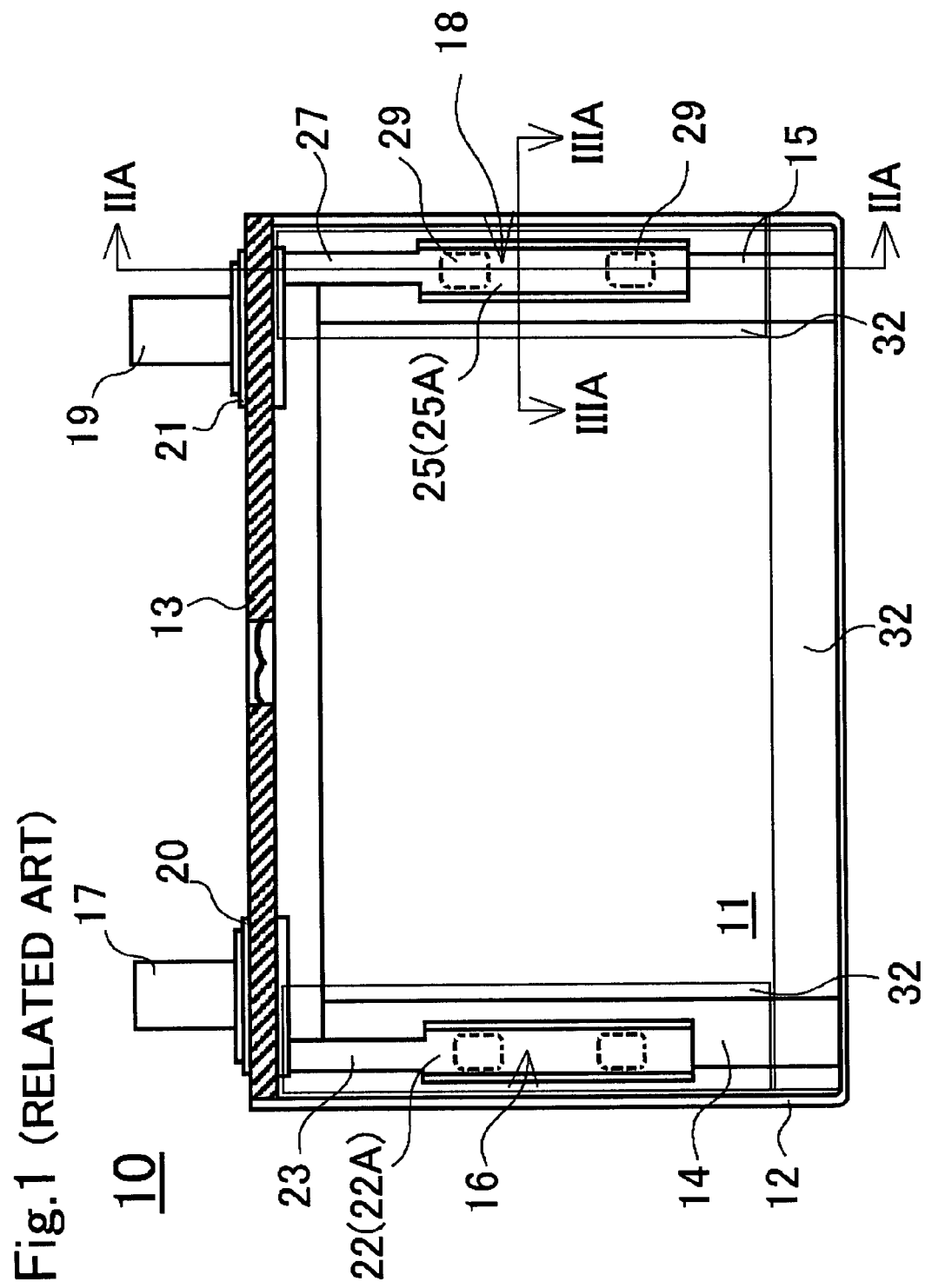
FIG. 1 is a front view illustrating a prismatic battery that is common to working examples and a comparative example and is seen through a battery outer can and an insulating sheet.
Figures 2A, 2B, 2C:
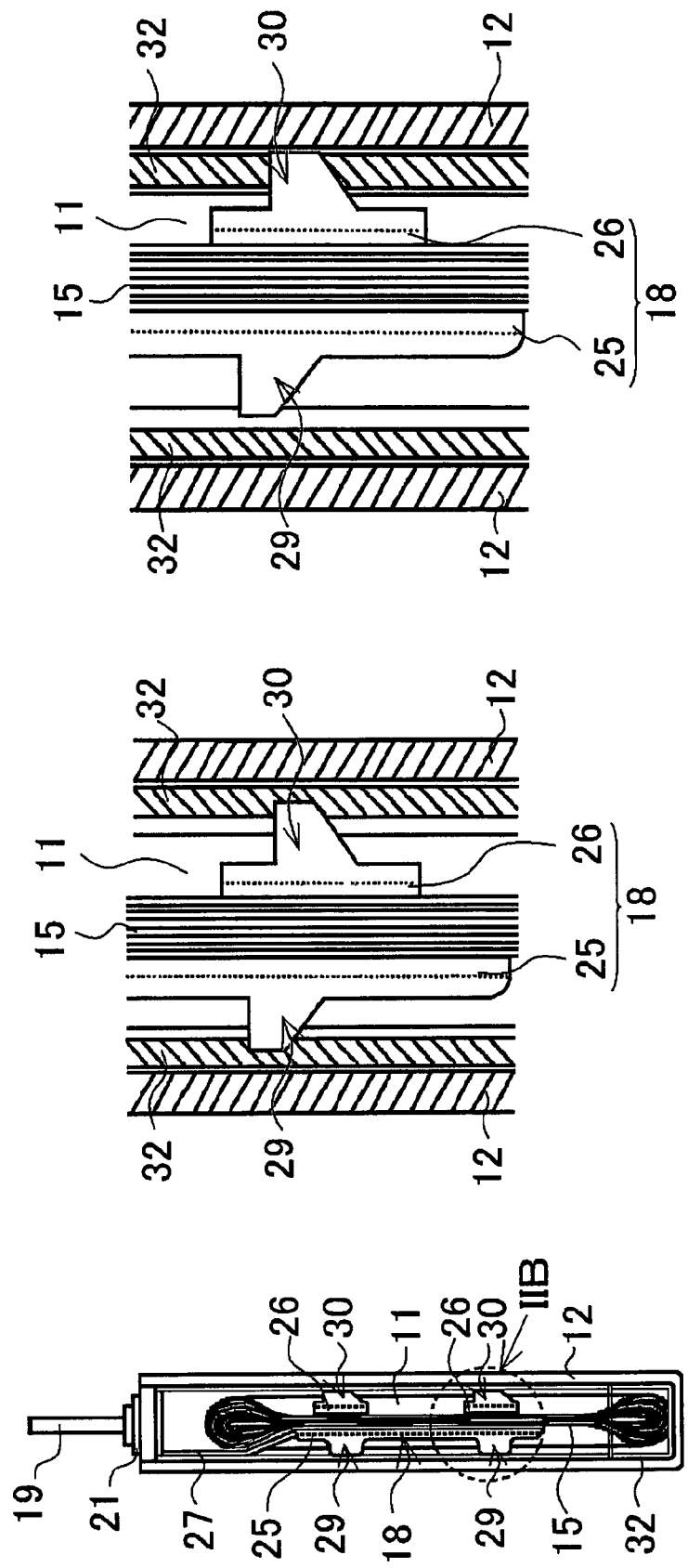
FIG. 2A is a cross-sectional view, along line IIA-IIA in FIG. 1, of the first comparative example prismatic battery.
FIG. 2B is an enlarged view of portion IIB in FIG. 2A with the battery inserted correctly.
FIG. 2C is an enlarged view of portion IIB in FIG. 2A with the battery displaced.
Figure 3B:
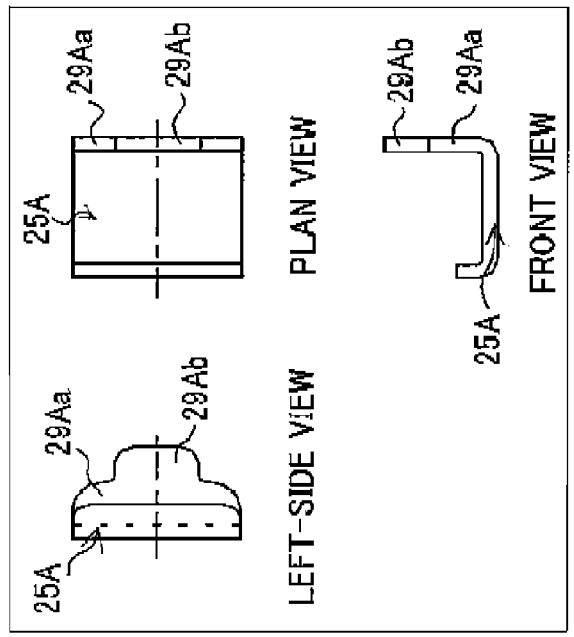
FIG. 3B illustrates a left-side view, a plan view, and a front view of a negative electrode collector used in the first working example.
Figure 3A:
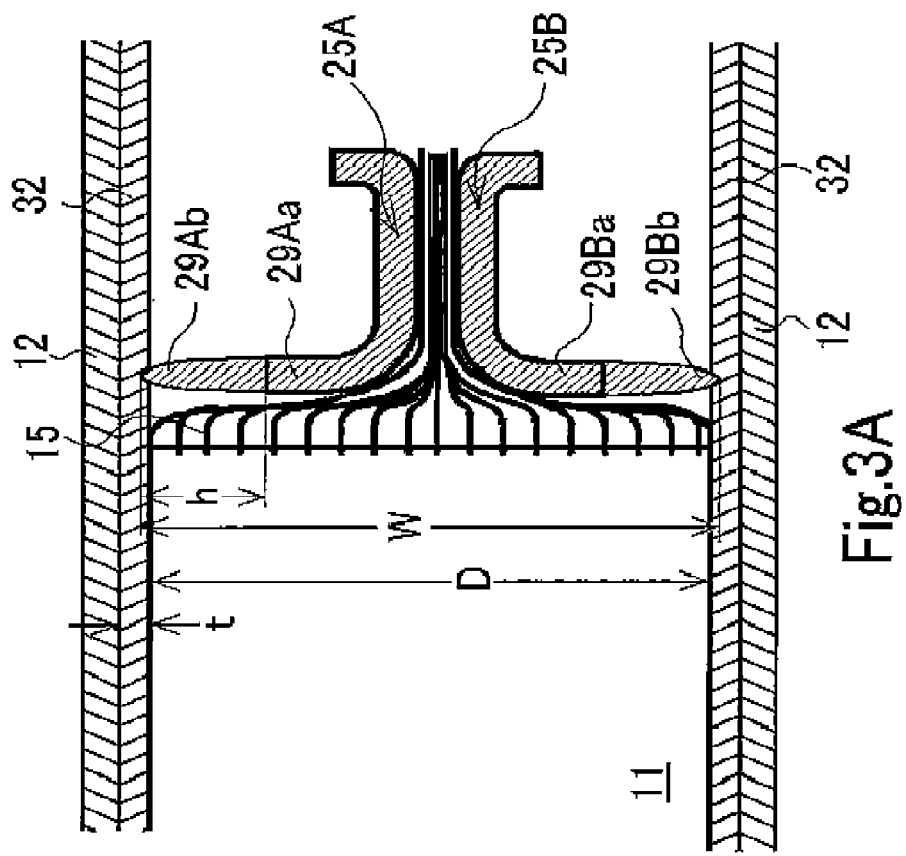
FIG. 3A is a cross-sectional view, along line IIIA-IIIA, of the first working example prismatic battery.
Figure 5B:
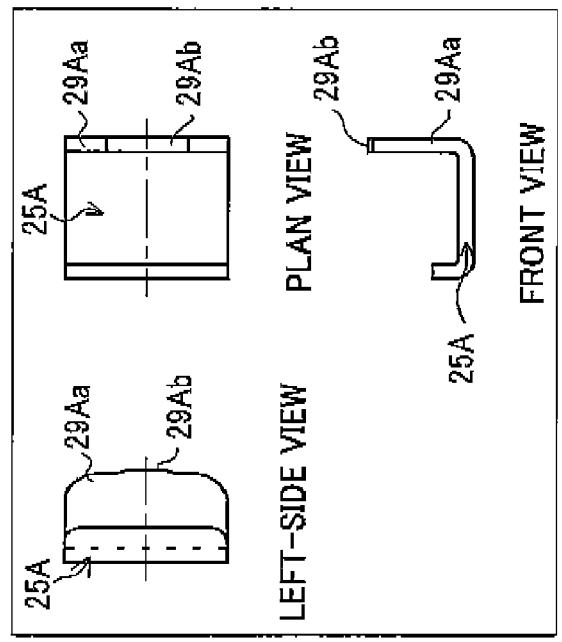
FIG. 5B illustrates a left-side view, a plan view, and a front view of a negative electrode collector used in the third working example.
Figure 5A:
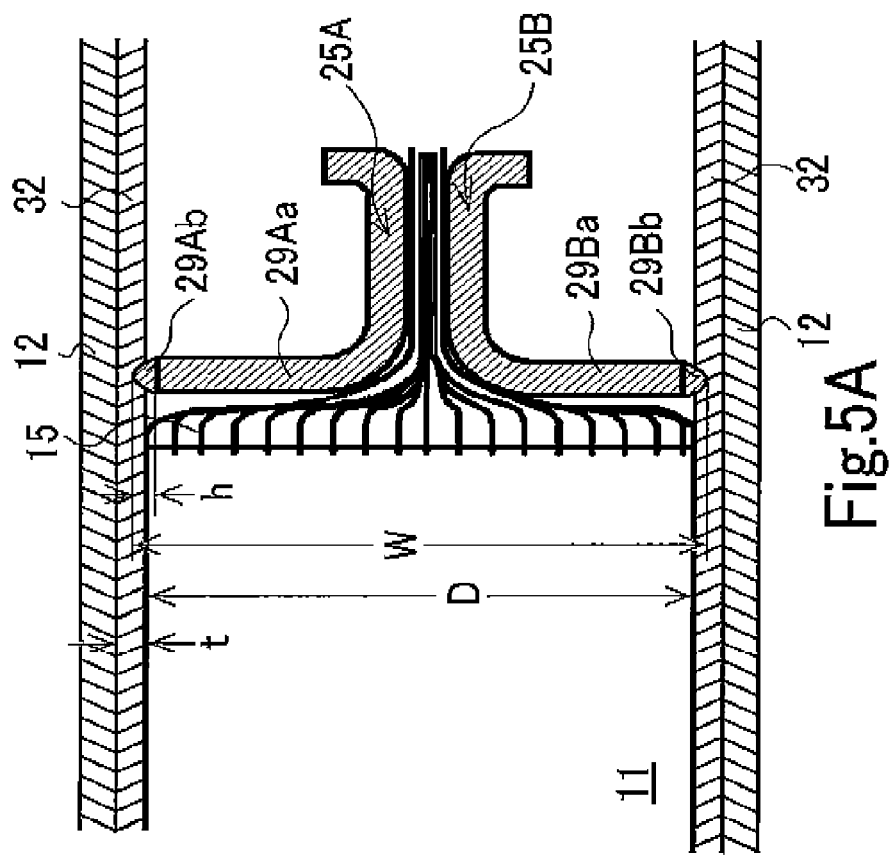
FIG. 5A is a cross-sectional view, corresponding to FIG. 3A, of the third working example prismatic battery.
Figure 7:
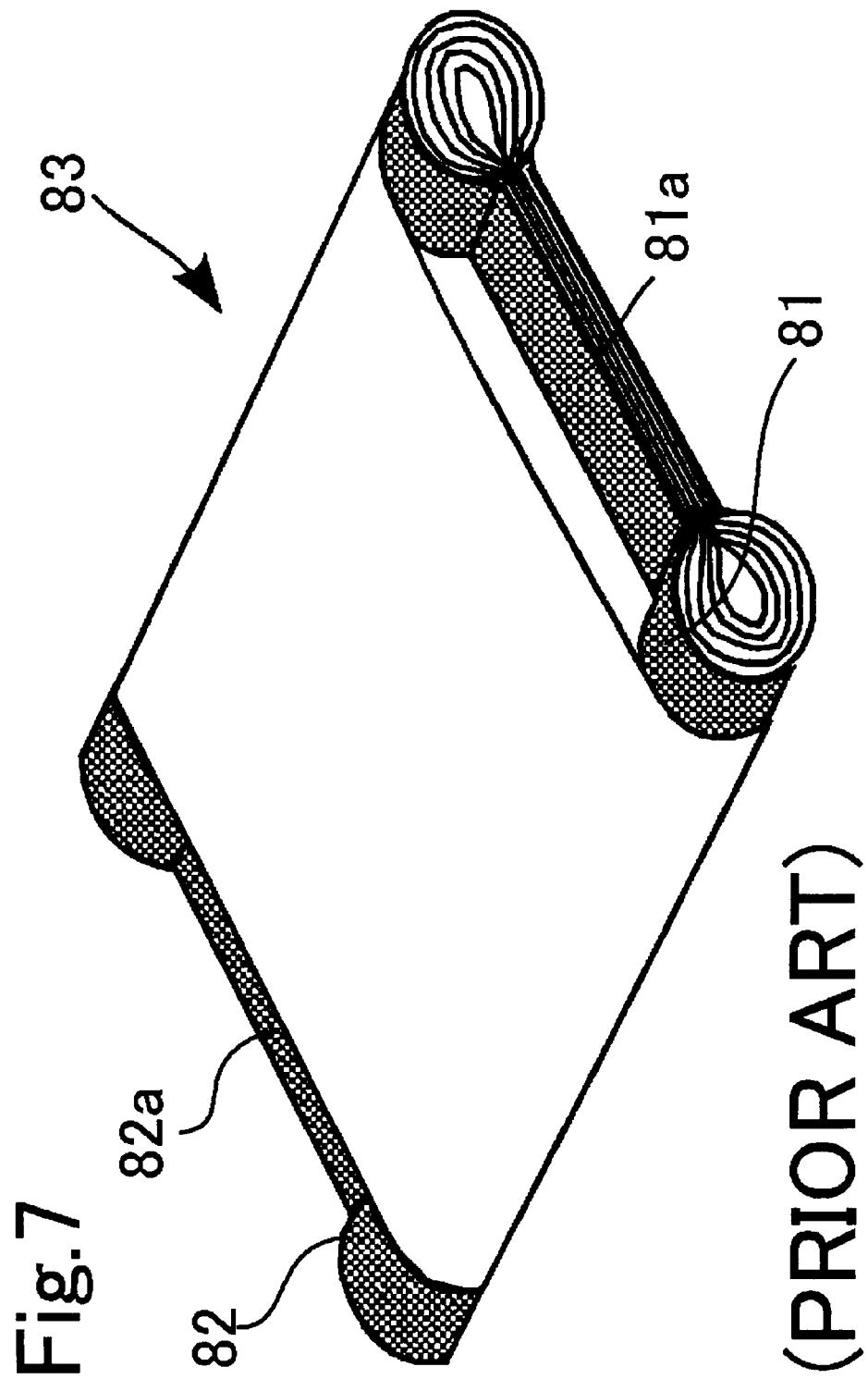
FIG. 7 is a perspective view of the flat electrode assembly shown in FIG. 6.
Figure 8B:
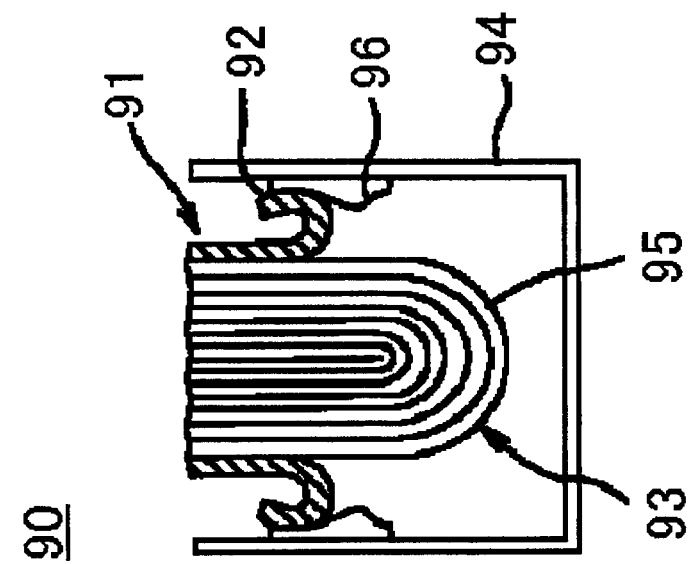
FIG. 8B is a partial enlarged view of a modification of the collector terminal shown in FIG. 8A.
Figure 8A:
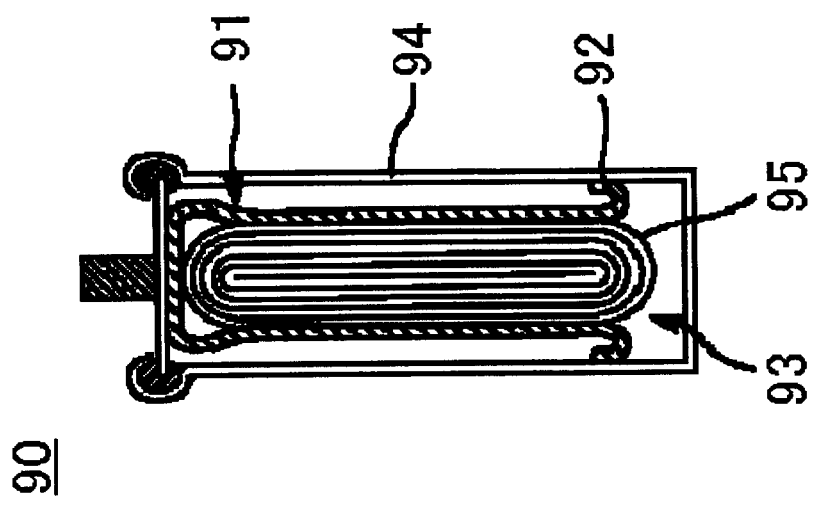
FIG. 8A is a cross-sectional view of a collector terminal according to another related-art example.

FIG. 1 is a front view illustrating a prismatic battery that is common to the working examples and the comparative example and is seen through a battery outer can and an insulating sheet. FIG. 2A is a cross-sectional view, along line IIA-IIA in FIG. 1, of the first comparative example prismatic battery, FIG. 2B is an enlarged view of portion IIB in FIG. 2A with the battery correctly inserted, and FIG. 2C is an enlarged view of portion IIB in FIG. 2A with the battery displaced. FIG. 3A is a cross-sectional view, along line IIIA-IIIA, of the first working example prismatic battery, and FIG. 3B illustrates a left-side view, a plan view, and a front view of a negative electrode collector used in the first working example. FIG. 4A is a cross-sectional view, along line IIA-IIA in FIG. 1, of the second working example prismatic battery, and FIG. 4B is an enlarged cross-sectional view of portion IVB in FIG. 4A. FIG. 5A is a cross-sectional view, corresponding to FIG. 3A, of the third working example prismatic battery, and FIG. 5B illustrates a left-side view, a plan view, and a front view of a negative electrode collector used in the third working example.

Prismatic batteries of the working examples and the comparative example have common components except for a component of a fixing portion of the positive electrode collector and negative electrode collector. First of all a nonaqueous electrolyte secondary battery as a prismatic battery that is common to both the working examples and the comparative example will be described using FIG. 1. Note that FIG. 1 only schematically shows the fixing portion.

In this nonaqueous electrolyte secondary battery as a prismatic battery 10, a flat electrode assembly 11 which is made up of a positive electrode plate (not shown in the drawings) and a negative electrode plate (not shown in the drawings) wound with a separator (not shown in the drawings) interposed is covered on the periphery and bottom with an insulating sheet 32 having a U-shaped cross section and is housed inside a prismatic battery outer can 12, and the outer can 12 is sealed by a sealing plate 13.

The flat electrode assembly 11 has a positive electrode substrate exposed portion 14 over which positive electrode binder is not spread at one end in the winding axis direction, and a negative electrode substrate exposed portion 15 over which negative electrode binder is not spread at the other. The positive electrode substrate exposed portion 14 is connected to a positive electrode terminal 17 via a positive electrode collector member 16 and the negative electrode substrate exposed portion 15 is connected to a negative electrode terminal 19 via a negative electrode collector member 18. The positive electrode terminal 17 and the negative electrode terminal 19 are fixed to the sealing plate 13 via insulating plates 20 and 21, respectively. The positive electrode collector member 16 and the negative electrode collector member 18 have similar configurations. The detailed configuration of the negative electrode collector member 18 will be described below, and a detailed description of the positive electrode collector member 16 will be omitted.

To fabricate this prismatic nonaqueous electrolyte secondary battery, the flat electrode assembly 11 is inserted into the battery outer can 12, then the sealing plate 13 is laser-welded over a mouth portion of the battery outer can 12, after which a nonaqueous electrolyte is poured in through an electrolyte pour hole (not shown) and the electrolyte pour hole is sealed up. Examples of the electrolyte may include a solution of ethylene carbonate and diethyl carbonate mixed in the proportion 3:7 by volume, into which 1 mole/L of $LiPF_6$ is dissolved to produce a nonaqueous electrolyte. Next is described a specific manufacturing method for the flat electrode assembly 11.

Fabrication of Positive Electrode Plate

The positive electrode plate is fabricated as follows. First of all, lithium cobalt oxide ($LiCoO_2$) powder serving as the positive electrode active material, carbon-based powder such as acetylene black or graphite serving as the conducting material, and binding agent constituted of polyvinylidene-fluoride (PVdF) are mixed in the proportions 94%, 3% and 3% by mass. Then an organic solvent constituted of N-methyl-2-pyrrolidone (NMP) is added to the resulting mixture and stirred in to form positive electrode active material slurry. Next, a positive electrode substrate constituted of aluminum foil (e.g., 20 μm thick) is prepared, and the positive electrode active material slurry made in the foregoing manner is applied evenly over both surfaces of the positive electrode substrate to form positive electrode active material mixture layers.

The positive electrode active material slurry is applied in such a manner that in the positive electrode active material mixture layer on one surface, a bare portion of a particular width (10 mm in this example) where the slurry is not applied is formed along the edge on one side in the width direction of the positive electrode substrate. After that, the positive electrode substrate with the positive electrode active material mixture layers formed thereon is passed through a drier, where the NMP that was needed during preparation of the slurry is removed and the substrate is dried. After such drying, the substrate is rolled in a roll press into a positive electrode plate of thickness 0.06 mm. The positive electrode plate thus fabricated is then cut into a strip 55.5 mm wide, so that a positive electrode plate is obtained that is provided with a 10 mm wide strip-form exposed portion constituted of aluminum foil (positive electrode substrate exposed portion 14).

Fabrication of Negative Electrode Plate

The negative electrode plate is fabricated as follows. First of all, natural graphite powder serving as the negative electrode active material, and carboxymethyl cellulose (CMC) and styrene-butadiene rubber ((SBR) serving as binding agents, are mixed in the proportions 98%, 1% and 1% by mass. Then water is added and the mixture is stirred to produce negative electrode active material slurry. Next, a negative electrode substrate constituted of copper foil (e.g., 12 μm thick) is prepared, and the negative electrode active material slurry made in the foregoing manner is applied evenly over both surfaces of the negative electrode substrate to form negative electrode active material mixture layers. The negative electrode active material slurry is applied in such a manner that along the edge on one side in the width direction of the negative electrode active material mixture layer, a bare portion of a particular width (10 mm in this example) where the slurry is not applied is formed along the edge of the negative electrode substrate. After that, the negative electrode substrate with the negative electrode active material mixture layers formed thereon is passed through a drier and dried. After such drying, the substrate is rolled in a roll press into a negative electrode plate of thickness 0.05 mm. The negative electrode plate thus fabricated is then cut into a strip 55.5 mm wide, so that a negative electrode plate is obtained that is provided with a 10 mm wide strip-form exposed portion constituted of copper foil (negative electrode substrate exposed portion 15).

Fabrication of Wound Electrode Assembly

The positive electrode substrate exposed portion 14 of the positive electrode plate and the negative electrode substrate exposed portion 15 of the negative electrode plate, which are obtained in the foregoing manner, are displaced so as not to overlie the electrode active material mixture layers that are respectively opposed to them, and then the electrode plates are wound, with a porous polyethylene separator (0.022 mm thick) interposed, to produce a flat electrode assembly 11 which has multiple positive electrode substrate exposed portions 14 constituted of aluminum foil formed at one end and multiple negative electrode substrate exposed portions 15 constituted of copper foil at the other, and which is used in the working examples and the comparative example. The outermost periphery of the flat electrode assembly 11 is covered with a porous separator, and the positive electrode plate and the negative electrode plate of the flat electrode assembly 11 and the battery outer can are electrically insulated.

Resistance Welding of Collectors

An explanation of the prismatic batteries of the first comparative example and the second working example will be given based on an example in which the positive electrode collector member 16 is composed of a positive electrode collector 22 and a positive electrode collector receiving portion (not shown), and the negative electrode collector member 18 is composed of a negative electrode collector 25 and a negative electrode collector receiving portion 26. Further, an explanation of the prismatic batteries of the first working example and the third working example will be given based on an example in which the positive electrode collector member 16 and the negative electrode collector member 18 are each composed of a pair of positive electrode collectors 22A (the other collector not shown) having a similar shape and negative electrode collectors 25A and 25B having a similar shape.

In the prismatic battery of the first comparative example and the second working example, installation of the positive electrode collector member 16 and the negative electrode collector member 18 is performed by resistance welding the aluminum positive electrode collector 22 and the positive electrode collector receiving portion (not shown) to the positive electrode substrate exposed portion 14 of the flat electrode assembly 11 fabricated as described above, and similarly, resistance welding the copper negative electrode collector 25 and the negative electrode collector receiving portion 26 to the negative electrode substrate exposed portion 15. Hereinafter, an explanation of installing the copper negative electrode collector 25 and the negative electrode collector receiving portion 26 to the negative electrode substrate exposed portion 15 by resistance welding will be given. As for the negative electrode collector 25, a collector having two projections 29 functioning as fixing portions and having a predetermined height, and a negative electrode lead 27 for electrically coupling with a negative electrode terminal 19 is used. Further, as for the negative electrode collector receiving portion 26, receiving portions including projections 30 are used. The height of the projections 30 is the same as that of the two projections 29 of the negative electrode collector 25.

First, the copper negative electrode substrate exposed portion 15 is bundled, the copper negative electrode collector 25 is arranged from above, and the negative electrode collector receiving portion 26 is arranged from below at a position corresponding to the two projections 29 of the negative electrode collector 25. Then, copper electrode bars of a resistance welding device (not shown) abut from above and below so as to sandwich one projection 29 of the negative electrode collector 25 and the negative electrode collector receiving portion 26. Then, both electrode bars are mutually depressed to be in a slightly short-circuited state, and an experimentally predetermined optimal welding current (for example, 4 kA) is applied for a short period of time between both electrode bars to perform resistance welding. The other projection 29 of the negative electrode collector and the negative electrode collector receiving portion 26 is resistance welded in the same manner. Also, resistance welding between the positive electrode collector 22 and the positive electrode collector receiving portions (not shown) is performed in the same manner as in the case of the negative electrode collector 25 and the negative electrode collector receiving portion 26.

Thereafter, the positive electrode lead 23 of the positive electrode collector 22 and the negative electrode lead 27 of the negative electrode collector 25 are crimped and joined to the positive electrode terminal 17 and the negative electrode terminal 19, respectively, via the sealing plate 13, the insulating plates 20 and 21, respectively, and a gasket (not shown).

Fabrication of Insulating Sheet

The insulating sheet 32 used in the prismatic battery of the first comparative example and the first working example is formed by folding a PP sheet having a thickness of, for example, 50 μm to have a U-shaped cross section. Into a space formed by the folded insulating sheet 32, the flat electrode assembly 11 integrally formed with the sealing plate 13 is inserted so that the positive electrode collector member 16 and the negative electrode collector member 18 are respectively positioned in a lateral direction. Then, portions where the positive electrode collector member 16 and the negative electrode collector member 18 exist are covered by the folded insulating sheet 32. The flat electrode assembly 11 installed with the insulating sheet 32 and integrally formed with the sealing plate 13 is housed inside the prismatic battery outer can 12 made of metal, then a joining section of the peripheral of the sealing plate and the battery outer can is laser-welded, after which a nonaqueous electrolyte of the above composition is poured in through an electrolyte inlet and the electrolyte inlet is sealed up. Thus, the prismatic battery of the first comparative example and the second working example is obtained.

As for the insulating sheet 32, other than PP, mechanically strong and high heat resistant materials such as one kind of resin selected from PE, PPS, PEEK, and nylon may be used.

FIRST COMPARATIVE EXAMPLE

Next, in order to confirm the effects of the prismatic battery of the invention, the structure of the fixing portion of the prismatic battery of the first comparative example will be explained with reference to FIG. 2A to FIG. 2C. As for the prismatic battery of the first comparative example, the negative electrode collector member 18 is composed of one negative electrode collector 25 and two negative electrode collector receiving portions 26. On a surface of the negative electrode collector 25, a projection 29 is formed on two locations. On the two negative electrode collector receiving portions 26, projections 30 are formed, respectively. The height of the projections 29 and 30 are, in order for them to act as the fixing portions by contacting the insulating sheet 32, thicker than the insulating sheet 32, and project from the flat electrode assembly 11 towards the battery outer can 12 side. The projections 29 and 30 as the fixing portions of the prismatic battery of the first comparative example have a blunt-angled surface at the base side of the battery outer can 12, and a flat surface at the top. Configured in this way makes it easy to insert the flat electrode assembly 11 with the insulating sheet 32 into the battery outer can 12.

FIG. 2B shows the flat electrode assembly 11 inserted with the insulating sheet 32 into the battery outer can 12 in a state where the assembly 11 is inserted so as the center line of the flat electrode assembly 11 precisely coincides with the center line of the battery outer can 12 in the width direction, that is, in a state where the assembly 11 is correctly inserted. In the state where the assembly 11 is inserted correctly, the projections 29 and 30 as the fixing portions are stressed evenly, and the projections rarely penetrate through the insulating sheet 32. On the other hand, when the flat electrode assembly 11 is inserted with the insulating sheet 32 into the battery outer can 12, and the center line of the flat electrode assembly 11 deviates in one direction from the center line of the battery outer can 12 in the width direction, the projections 29 and 30 projects from the flat electrode assembly 11 towards the battery outer can 12 side. Thus, as shown in FIG. 2C, for example, the projection 30 of the negative electrode collector receiving portion 26 penetrates through the insulating sheet 32, and the negative electrode collector receiving portion 26 and the battery outer can 12 may be short-circuited.

FIRST WORKING EXAMPLE

A structure of a fixing portion of the prismatic battery of the first working example will be explained with reference to FIG. 3A and FIG. 3B. In the prismatic battery of the first working example, since the positive electrode collector member 16 forming the fixing portion on the positive electrode side and the negative electrode collector member 18 forming the fixing portion on the negative electrode side have the same structure, the negative electrode collector member 18 forming the fixing portion on the negative side will be explained in detail, and an explanation of a structure of the positive electrode collector member 16 will be omitted (hereinafter, the same is true for the second working example and the third working example).

The negative electrode collector member 18 of the prismatic battery of the first working example includes a pair of negative electrode collectors 25A and 25B having a similar shape. Both of the negative electrode collectors 25A and 25B are folded and are erect from the negative electrode substrate exposed portion 15 side towards the battery outer can 12 side, and formed with first projections 29Aa and 29Ba that do not project from the flat electrode assembly 11 towards the battery outer can 12 side. Second projections 29Ab and 29Bb are formed on the tip portions of the first projections 29Aa and 29Ba. As shown in FIG. 3B, the second projections 29Ab and 29Bb are formed in an elongated shape along the surfaces of the tip portions of the folded negative electrode collectors 25A and 25B. Having such a structure, since the second projections 29Ab and 29Bb are formed on the first projections 29Aa and 29Ba, respectively, the contacting area of the second projections 29Ab and 29Bb with respect to the insulating sheet 32 is smaller than the contacting area of the first projections 29Aa and 29Ba with respect to the insulating sheet 32. Thus, insertability and fixability of the flat electrode assembly 11 to the battery outer can 12 become preferable, and the manufacturing yield of the prismatic battery is improved.

In the negative electrode collector member 18 of the prismatic battery of the first working example, the height of the first projections 29Aa and 29Ba is in a state so as not to project from the flat electrode assembly 11 towards the battery outer can 12 side. Also, the height of the portions of the second projections 29Ab and 29Bb projecting from the flat electrode assembly 11 is smaller than the thickness of the insulating sheet 32. More specifically, given that the thickness of the flat electrode assembly 11 is D, the total thickness of the negative electrode collector member 18 including the thickness of the negative electrode substrate exposed portion 15 is W, and the thickness of the insulating sheet 32 is t, the prismatic battery of the first working example is selected to be $(W-D)/2 < t$. As long as the above condition is satisfied, the height of the second projections 29Ab and 29Bb can be made larger than the thickness of the insulating sheet 32.

With such a condition satisfied, even if the flat electrode assembly 11 is inserted in the battery outer can 12 with the center of the assembly 11 deviating from the center line of the battery outer can 12 and the second projections 29Ab and 29Bb of the negative electrode collector 25 bite into the insulating sheet 32, since the flat electrode assembly 11 contacts the insulating sheet 32 before the second projections 29Ab and 29Bb penetrate through the insulating sheet 32, the second projections 29Ab and 29Bb rarely penetrate through the insulating sheet 32. Thus, with the prismatic battery of the first working example, even if the battery is used with large vibration, the positive electrode collector member 16 and the negative electrode collector member 18 are rarely short-circuited with the battery outer can 12. Thus, a prismatic battery suitable for EVs and HEVs with excellent safety can be obtained.

SECOND WORKING EXAMPLE

A structure of a fixing portion of the prismatic battery of the second working example will be explained with reference to FIG. 4A and FIG. 4B. The negative electrode collector member 18 of the prismatic battery of the second working example is, like the fixing portion of the first comparative example, composed of the negative electrode collector 25 and the two negative electrode receiving portions 26. On the surface of the negative electrode collector 25, the projection 29 is formed on two locations. On the two negative electrode collector receiving portions 26, the projections 30 are formed, respectively. The projections 29 formed on two locations on the surface of the negative electrode collector 25 includes a first projection 29a on the surface side of the negative electrode collector 25 having a large area, and a second projection 29b formed on the surface of the first projection 29a and having a smaller area than the first projection. Also, the projection 30 formed on the surface of the negative electrode collector receiving portion 26 includes a first projection 30a on the surface side of the negative electrode collector receiving portion 26 having a large area, and the second projection 30b formed on the surface of the first projection 30a and having a smaller area than the first projection 30a.

As for the projections 29 formed on two locations on the surface of the negative electrode collector 25 and the projection 30 formed on the negative electrode collector receiving portion, the first projections 29a and 30a are in a state so as not to project from the flat electrode assembly 11 towards the battery outer can 12 side, and the second projections 29b and 30b project from the flat electrode assembly 11 towards the battery outer can 12 side with the height thereof being smaller than the thickness of the insulating sheet 32, respectively. More specifically, given that the thickness of the flat electrode assembly 11 is D, the total thickness of the negative electrode collector member 18 including the thickness of the negative electrode substrate exposed portion 15 is W, the thickness of the insulating sheet 32 is t, and the height of the second projection 29b and 30b is h, the prismatic battery of the second working example is selected to be $(W-D)/2 < t$ and $t > h$.

With such a condition satisfied, even if the flat electrode assembly 11 is inserted in the battery outer can 12 with the center of the assembly 11 deviating from the center line of the battery outer can 12 and the second projection 29b of the negative electrode collector 25 and the second projection 30b of the negative electrode collector receiving portion 26 bite into the insulating sheet 32, since the height of the portions of the second projections 29b and 30b that project from the flat electrode assembly 11 is smaller than the thickness of the insulating sheet 32, and the flat electrode assembly 11 contacts the insulating sheet 32 before the second projections 29b and 30b penetrate through the insulating sheet 32, the second projections 29b and 30b rarely penetrate through the insulating sheet.

Also, since the height of the second projections 29b and 30b is smaller than the thickness of the insulating sheet 32, even if the negative electrode collector member 18 is welded to the negative electrode substrate exposed portion 15 deviating from the center position of the flat electrode assembly 11, and the first projections 29a and 29b project from the flat electrode assembly 11 towards the battery outer can 12 side, the first projections 29a and 30a contact the insulating sheet 32 at the periphery of the second projections so that the second projections 29b and 30b rarely penetrate through the insulating sheet 32. Thus, with the prismatic battery of the invention, even if the battery is used under the condition in which vibration is applied, the positive electrode collector and the negative electrode collector are rarely short-circuited with the battery outer can compared to related-art prismatic batteries, whereby the reliability is improved. A prismatic battery capable of charging and discharging large current can be thus obtained which is suitable for EVs and HEVs.

THIRD WORKING EXAMPLE

A structure of a fixing portion of the prismatic battery of the third working example will be explained with reference to FIG. 5A and FIG. 5B. The negative electrode collector member 18 of the prismatic battery of the third working example is the same as that of the prismatic battery of the first working example in the point that both of the negative electrode collectors 25A and 25B are folded and are erect from the negative electrode substrate exposed portion 15 side, and formed with the first projections 29Aa and 29Ba that do not project from the flat electrode assembly 11 towards the battery outer can 12 side, and that the second projections 29Ab and 29Bb are formed on the tip portions of the first projections 29Aa and 29Ba so as the second projections 29Ab and 29Bb project from the flat electrode assembly 11. On the other hand, the structure of the negative electrode collector member 18 of the prismatic battery of the third working example is different from that of the negative electrode collector member 18 of the prismatic battery of the first working example in the point that the height of the second projections 29Ab and 29Bb is smaller than the thickness of the insulating sheet 32 like in the prismatic battery of the second working example. More specifically, given that the thickness of the flat electrode assembly 11 is D, the total thickness of the negative electrode collector member 18 including the thickness of the negative electrode substrate exposed portion 15 is W, the thickness of the insulating sheet 32 is t, and the height of the second projections 29Ab and 29Bb is h, the prismatic battery of the third working example is selected to be $(W-D)/2 < t$ and $t > h$.

With the prismatic battery of the third working example having the above described structure, even if the second projections 29Ab and 29Bb bite into the insulating sheet 32, since the height of the portions of the second projections 29Ab and 29Bb that project from the flat electrode assembly 11 is smaller than the thickness of the insulating sheet 32, the flat electrode collector 11 contacts the insulating sheet 32 before the second projections 29Ab and 29Bb penetrate through the insulating sheet 32, the second projections 29Ab and 29Bb rarely penetrate through the insulating sheet 32. Also, since the height of the second projections 29Ab and 29Bb is smaller than the thickness of the insulating sheet 32, even if the negative electrode collector member 18 is welded to the negative electrode substrate exposed portion 15 deviating from the center position of the flat electrode assembly 11, and the first projections 29Aa and 29Ba project from the flat electrode assembly 11 towards the battery outer can 12 side, the first projections 29Aa and 29Ba contact the insulating sheet 32 at the periphery of the second projections so that the second projections 29Ab and 29Bb rarely penetrate through the insulating sheet 32. Thus, with the prismatic battery of the third working example, like in the case of the prismatic battery of the first working example, even if the battery is used with large vibration, the positive electrode collector member 16 and the negative electrode collector member 18 are rarely short-circuited with the battery outer can 12. Therefore, a prismatic battery suitable for EVs and HEVs with excellent safety can be obtained.

The first working example to the third working example described above show the example of using the insulating sheet 32 that is formed by being folded to have a U-shaped cross section. However, the invention is not limited thereto. More specifically, the insulating sheet 32 leastwise covers the positive electrode collector member 16 and the negative electrode collector member 18. Thus, any other form of sheet may be used, as long as the insulating sheet 32 covers the surfaces of the positive electrode collector member 16 and the negative electrode collector member 18 by folding the sheet, for example.

Also the first working example to the third working example described above illustrate the positive electrode collector member 16 and the negative electrode collector member 18 formed with four projections respectively (second working example), or formed with projections in two locations (first working example and third working example). However, as long as a projection is formed on at least at one location of at least one of the positive electrode collector member 16 and the negative electrode collector member 18, predetermined effect is obtained. Further, the first working example to the third working example described above illustrate the positive electrode collector member 16 and the negative electrode collector member 18 that respectively include the first projection and the second projection. However, as long as the projection projects from the flat electrode assembly 11 toward the battery outer can 12 side only by an amount smaller than the thickness of the insulating sheet, even if the projection is singly provided, since the flat electrode assembly 11 contacts the insulating sheet before the projection penetrates through the insulating sheet 32, predetermined effect described above is obtained.

The first working example to the third working example described above explain an example of applying the invention to a nonaqueous electrolyte secondary battery. However, the prismatic battery of the invention is not limited to the nonaqueous electrolyte secondary battery. As long as the prismatic battery has an electrode group formed with the positive electrode substrate exposed portion on one end, and the negative electrode substrate exposed portion on the other end housed inside the prismatic battery outer can made of metal, the prismatic battery of the invention can be used for alkaline storage batteries such as a nickel-hydrogen storage battery and a nickel-cadmium storage battery, and other storage batteries. Further, although the first working example to the third working example described above illustrate an example of using the flat electrode assembly formed by flattening a wound electrode assembly, the invention can be applied as long as the electrode assembly is flat. For example, a flat electrode assembly stacking a flat positive electrode plate and negative electrode plate with the separator interposed therebetween can be applied.

What is claimed is:

1. A prismatic battery comprising:
   a flat electrode assembly in which a positive electrode plate formed with a positive electrode substrate exposed portion at an end portion and a negative electrode plate formed with a negative electrode exposed portion at an end portion are wound or stacked in a state where the positive electrode substrate exposed portion and the negative electrode substrate exposed portion are opposed to each other while being insulated from each other by a separator interposed therebetween;
   the positive electrode substrate exposed portion being bundled and welded with a positive electrode collector member;
   the negative electrode substrate exposed portion being bundled and welded with a negative electrode collector member;
   the flat electrode assembly being housed inside a prismatic battery outer can so that the positive electrode collector member is positioned at one end of the prismatic battery outer can and the negative electrode collector member is positioned at the other end;
   a fixing portion for fixing the position of the flat electrode assembly inside the prismatic battery outer can by contacting an insulating sheet, said fixing portion being provided on at least one of the positive electrode collector member and the negative electrode collector member;
   the insulating sheet being provided between the fixing portion and the prismatic battery outer can; and
   a portion of the fixing portion projecting from the flat electrode assembly towards the prismatic battery outer can side only by an amount smaller than the thickness of the insulating sheet in the direction perpendicular to the inner surface of the prismatic battery outer can facing the insulating sheet;
   all of the insulating sheet being housed inside the prismatic battery outer can.

2. The prismatic battery according to claim 1, wherein the fixing portion is provided with a first projection that does not project from the flat electrode assembly towards the prismatic battery outer can side, and a second projection that:
   is formed on the first projection,
   projects from the flat electrode assembly towards the prismatic battery outer can side only by an amount smaller than the thickness of the insulating sheet, and
   has a height smaller than the thickness of the insulating sheet.

3. The prismatic battery according to claim 2, wherein the first projection is formed on a surface of at least one of the positive electrode collector member and the negative electrode collector member.

4. The prismatic battery according to claim 2, wherein the first projection is formed of a folded portion of at least one of the positive electrode collector member and the negative electrode collector member.

5. The prismatic battery according to claim 1, wherein the insulating sheet is made of an insulating resin sheet.

6. The prismatic battery according to claim 5, wherein the insulating resin sheet is made of one kind of resin selected from polypropylene, polyethylene, polyphenylene sulfide, polyether ether ketone, and nylon.

7. The prismatic battery according to claim 1, wherein the flat electrode assembly is inserted into the prismatic battery outer can having a mouth portion, a positive electrode terminal and a negative electrode terminal are fixed to a sealing plate which seals the mouth portion of the prismatic battery outer can via insulating plate respectively, the positive electrode substrate is connected electrically to the positive electrode terminal, and, the negative electrode substrate is connected to the negative electrode terminal.

8. The prismatic battery according to claim 2, wherein the width of the second projection is narrower than the width of the first projection.

* * * * *